(12) United States Patent
Young et al.

(10) Patent No.: US 6,765,322 B2
(45) Date of Patent: Jul. 20, 2004

(54) AMORTISSEUR VIBRATION DAMPER

(75) Inventors: John M. Young, Omemee (CA); Martin van Duyn, Peterborough (CA)

(73) Assignee: General Electric Canada, Inc., Ontario (CA)

( * ) Notice: Subject to any disclaimer, the term of this patent is extended or adjusted under 35 U.S.C. 154(b) by 8 days.

(21) Appl. No.: 09/682,182

(22) Filed: Aug. 1, 2001

(65) Prior Publication Data
US 2003/0025407 A1 Feb. 6, 2003

(51) Int. Cl.[7] ............................. H02K 5/24
(52) U.S. Cl. ................................. 310/51; 310/261
(58) Field of Search ............... 310/51, 183, 156.78, 310/211, 261, 270

(56) References Cited

U.S. PATENT DOCUMENTS

| | | | |
|---|---|---|---|
| 3,973,196 A | 8/1976 | Hogg | |
| 4,139,790 A | * 2/1979 | Steen | 310/156 |
| 4,249,098 A | * 2/1981 | Karlen et al. | 310/183 |
| 4,327,302 A | 4/1982 | Hershberger | |
| 4,341,124 A | 7/1982 | Rodgers et al. | |
| 4,381,681 A | 5/1983 | Bell | |
| 4,434,546 A | 3/1984 | Hershberger | |
| 4,437,325 A | 3/1984 | Hershberger | |
| 4,453,101 A | * 6/1984 | Nelson | 310/211 |
| 4,476,736 A | 10/1984 | Hershberger | |
| 4,506,181 A | 3/1985 | Jones et al. | |
| 4,572,978 A | 2/1986 | VanDuyn | |
| 4,689,973 A | 9/1987 | Hershberger | |
| 4,806,717 A | 2/1989 | Hershberger | |
| 4,884,473 A | 12/1989 | Lew | |
| 4,918,343 A | * 4/1990 | Heinrich et al. | 310/58 |
| 5,000,052 A | 3/1991 | Sipin | |
| RE33,655 E | 8/1991 | Hershberger | |
| 5,177,390 A | * 1/1993 | Van Maaren | 310/183 |
| 5,521,448 A | * 5/1996 | Tecza et al. | 310/90.5 |
| 5,627,425 A | * 5/1997 | Kaida et al. | 310/321 |

FOREIGN PATENT DOCUMENTS

| | | |
|---|---|---|
| CA | 2017474 | 6/1999 |
| EP | 0 952 655 A2 | 10/1999 |

* cited by examiner

Primary Examiner—Thanh Lam
(74) Attorney, Agent, or Firm—Karl A. Vick, Esq.; Armstrong Teasdale LLP

(57) ABSTRACT

A method for facilitating damping torsional or ring vibrations of a dynamoelectric machine including a rotor assembly with a first amortisseur bar and a second amortisseur bar extending therefrom and terminating at an endring is provided. The method includes providing a damping assembly, and positioning the damping between the first amortisseur bar and the second amortisseur bar such that the damping assembly contacts the first and second amortisseur bars, and is substantially proximate the endring or alternatively the damping assembly is positioned only over one amortisseur bar.

10 Claims, 4 Drawing Sheets

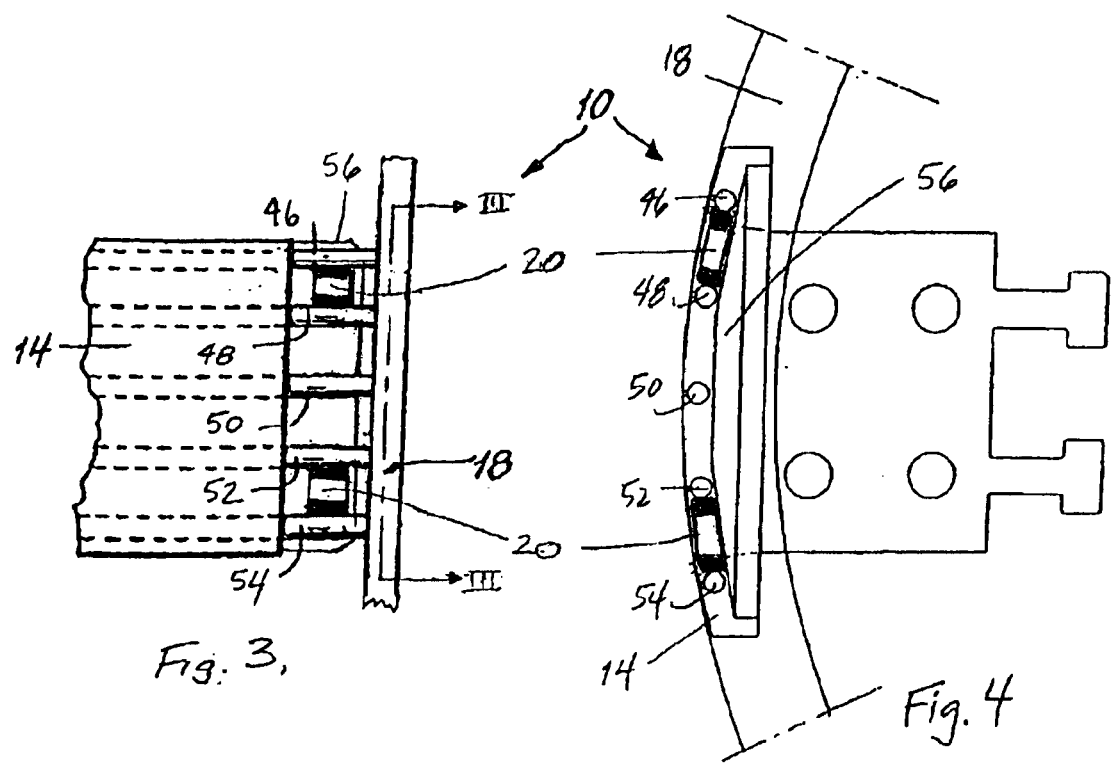

AMORTISSEUR VIBRATION DAMPER

BACKGROUND OF THE INVENTION

This invention relates generally to dynamoelectric machines and more particularly to damping amortisseur bar vibration.

Dynamoelectric machines are utilized in many manufacturing applications. Failure of key components within a dynamoelectric machine, such as amortisseur bars, can cause lost production time, injury to personnel, and loss of capital equipment, all of which can reduce profitability. One known cause of dynamoelectric machine failure is motor airgap torque pulsations. When the frequency of these pulsations equal the torsional or ring natural frequency of the amortisseur bars, resonance occurs. In that case the vibratory stresses in the amortisseur bars may exceed a fatigue endurance limit and an amortisseur bar fatigue failure may occur. Subsequently the broken amortisseur bar may bend radially outwards under the action of centrifugal forces and contacts a stator winding end head with harmful consequences.

A factor in these failures is the fact that the inherent damping characteristic of amortisseur bars is low. As a consequence when resonance occurs, very small torque pulsations will result in a significant vibratory response, if, and when, the pulsation frequency equals the torsional natural frequency of the amortisseur bars.

SUMMARY OF THE INVENTION

In one aspect, a method for facilitating damping torsional vibrations of a dynamoelectric machine including a rotor assembly with a first amortisseur bar and a second amortisseur bar extending therefrom and terminating at an endring is provided. The method includes providing a damping assembly, and positioning the damping assembly between the first amortisseur bar and the second amortisseur bar such that the damping assembly contacts the first and second amortisseur bars, and is substantially proximate the endring.

In another aspect, an amortisseur bar damping device includes a rigid support member including a first side and a second side opposite the first side, and a first resilient member disposed to the first side and a second resilient member disposed to the second side.

In another aspect, a damping assembly includes a rotor core, a first amortisseur bar, and a second amortisseur bar. Both the first and second amortisseur bars extend from the core and the second amortisseur bar is substantially parallel to the first amortisseur bar. The damping assembly also includes a damping device contacting the first and second amortisseur bars distal from the rotor core and substantially proximate an endring. The damping device also includes a rigid support member including a first side and a second side opposite the first side, and a first resilient member disposed to the first side and a second resilient member disposed to the second side.

In another aspect, a motor includes a housing and a stator including a bore therethrough is mounted in the housing. The motor also includes a rotor shaft extending at least partially through the bore. A rotor assembly is mounted on the rotor shaft. The rotor assembly includes a rotor core mounted to the rotor shaft, and a plurality of amortisseur bars extending axially through and projecting from at least one end of the rotor core. It also includes a plurality of endrings connected to each end of the amortisseur bars distal from the core. The rotor assembly also includes an endplate attached to the core, and an amortisseur bar damping device mounted between at least two of the amortisseur bars, the amortisseur bar damping device distal the core and substantially proximate endring.

In another aspect, an amortisseur bar damping device includes a rigid support member including a first side and a second side opposite the first side. A U shaped channel is disposed longitudinally along the first side. The damping device also includes a resilient member disposed to the U shaped channel.

BRIEF DESCRIPTION OF DRAWINGS

FIG. 3 is a partial end view of a rotor taken in the direction of section line II II in FIG. 1 including the amortisseur bar damping device shown in FIG. 2.

FIG. 4 is a partial cross section of a rotor assembly taken along section line III III in FIG. 3 including the amortisseur bar damping device shown in FIG. 2.

DETAILED DESCRIPTION

Figure 1:
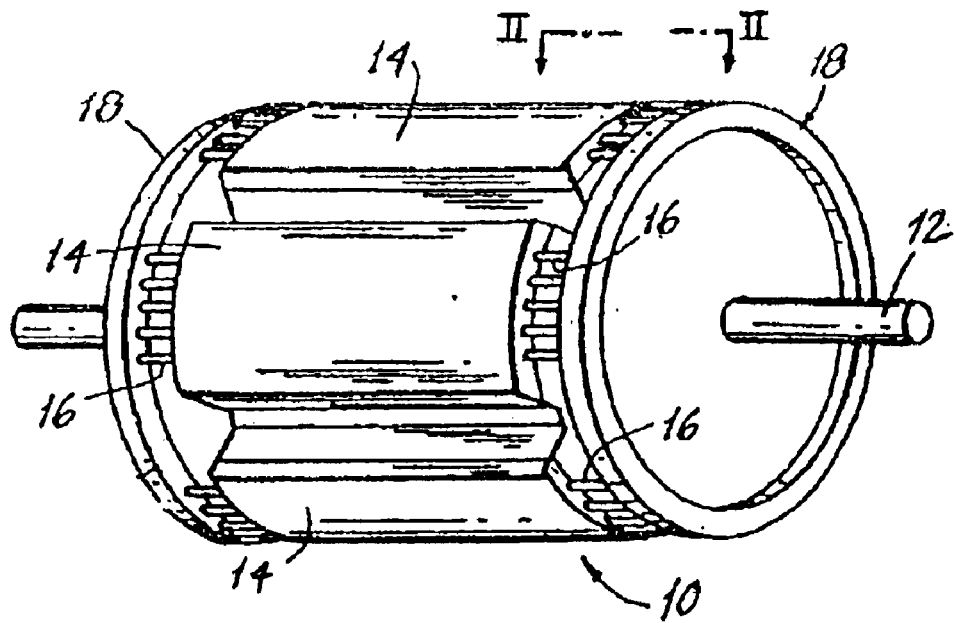
FIG. 1 is a perspective view of a known rotor assembly.

FIG. 1 is a perspective view of a known rotor assembly 10. Rotor assembly 10 includes a plurality of rotor core sections 14 disposed about a shaft 12. Each rotor core section 14 includes a plurality of amortisseur bars 16 passing axially therethrough and extending a substantial distance beyond rotor core section"s 14 ends. Amortisseur bars 16 extend over an endplate (not shown in FIG. 1) that is rigidly disposed to rotor core 14. Amortisseur bars 16 terminate at a plurality of endrings 18. Although five amortisseur bars are shown in each rotor core section 14, more or less amortisseur bars 16 may be employed.

Figure 2:
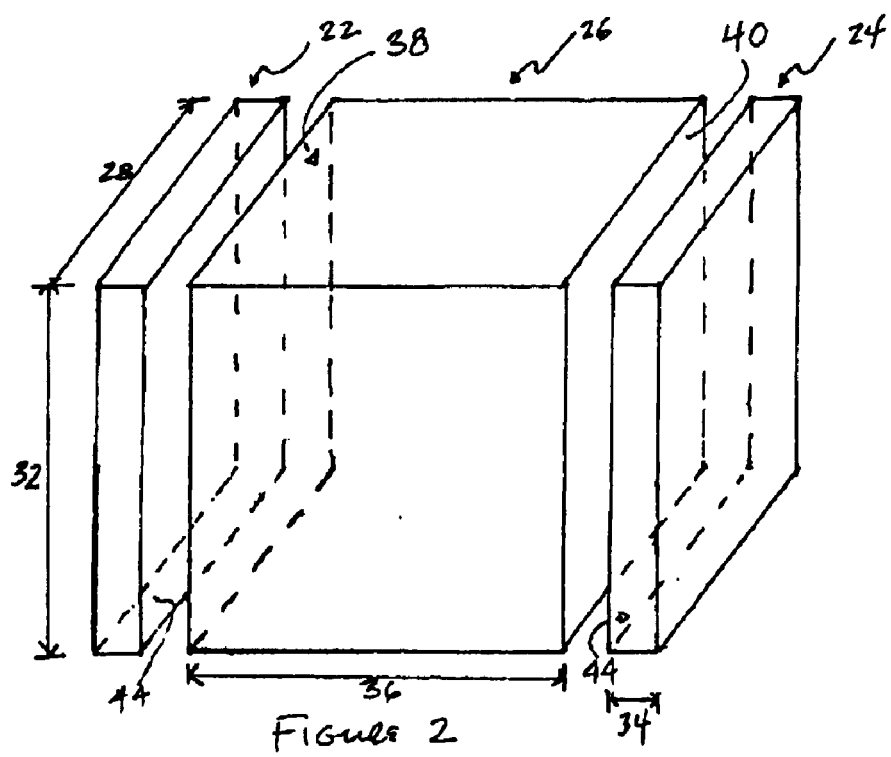
FIG. 2 is a perspective view of an amortisseur bar damping device.

FIG. 2 is a perspective view of an amortisseur bar damping device 20 including a first member 22, a second member 24, and a third member 26 disposed between first member 22 and second member 24. First and second members 22 and 24 each include a width 28, a height 32, a thickness 34, and a side 44. Thickness 34 is substantially constant. First member 22 and second member 24 comprise a resilient material and substantially rectangular width 28 substantially greater than thickness 34. In one embodiment, first and second members 22 and 24 are manufactured from vulcanized natural rubber. Alternatively, first and second members 22 and 24 are manufactured from a synthetic elastomer such as neoprene.

Third member 26 includes a first side 38 and a second side 40 opposite first side 38. First member side 44 is disposed to first side 38 of third member 26, and second member side 44 is disposed to second side 40 of third member 26. In one embodiment, first member side 44 is bonded to first side 38 of third member 26, and second member side 44 is bonded to second side 40 of third member 26. Third member 26 includes a width 28, a height 32, and a thickness 36. Thickness 36 is substantially constant. Third member 26 is machined from a rigid material and substantially cubicle having width 28, height 32, and thickness 36 substantially equal. In another embodiment, third member 26 is rectangular having width 28 substantially greater than height 32. In one embodiment, third member 26 is machined from stainless steel. Alternatively, third member 26 is machined from titanium.

Amortisseur bar damping device 20 is utilized to facilitate a reduction of torsional vibrations in dynamoelectric machines. It is contemplated that the benefits of amortisseur bar damping devices 20 accrue to all rotor assemblies and motors having amortisseur bars. In one embodiment, amortisseur bar damping device 20 is utilized to facilitate a reduction of torsional vibrations in motors for refiner drives on a sinusoidal power supply.

FIG. 3 is a partial end view of rotor 10 taken in the direction of section line II II in FIG. 1 including an amortisseur bar damping device 20 shown in FIG. 2. FIG. 4 is a partial cross section of rotor 10 taken along section line III III in FIG. 3 including amortisseur bar damping device 20 shown in FIG. 2. Amortisseur bars 16 extend past an endplate 56 that is rigidly disposed on rotor core 14. Amortisseur bars 16 terminate at endring 18. Amortisseur bars 16 include amortisseur bars 46, 48, 50, 52, and 54. In an exemplary embodiment, a first amortisseur bar damping device 20 is disposed between amortisseur bar 46 and amortisseur bar 48, and a second amortisseur bar damping device 20 is disposed between amortisseur bar 52 and amortisseur bar 54. First and second amortisseur bar damping devices 20 are positioned substantially proximate to endring 18.

In one embodiment, amortisseur bar 46, amortisseur bar 48, and amortisseur bar 50 are adjacent such that amortisseur bar damping device 20 is disposed between first amortisseur bar 46 and second amortisseur bar 48, and a second amortisseur bar damping device 20 is disposed between amortisseur bar 48 and third amortisseur bar 50. First and second amortisseur bar damping devices 20 are positioned substantially proximate to endring 18.

Figure 5:
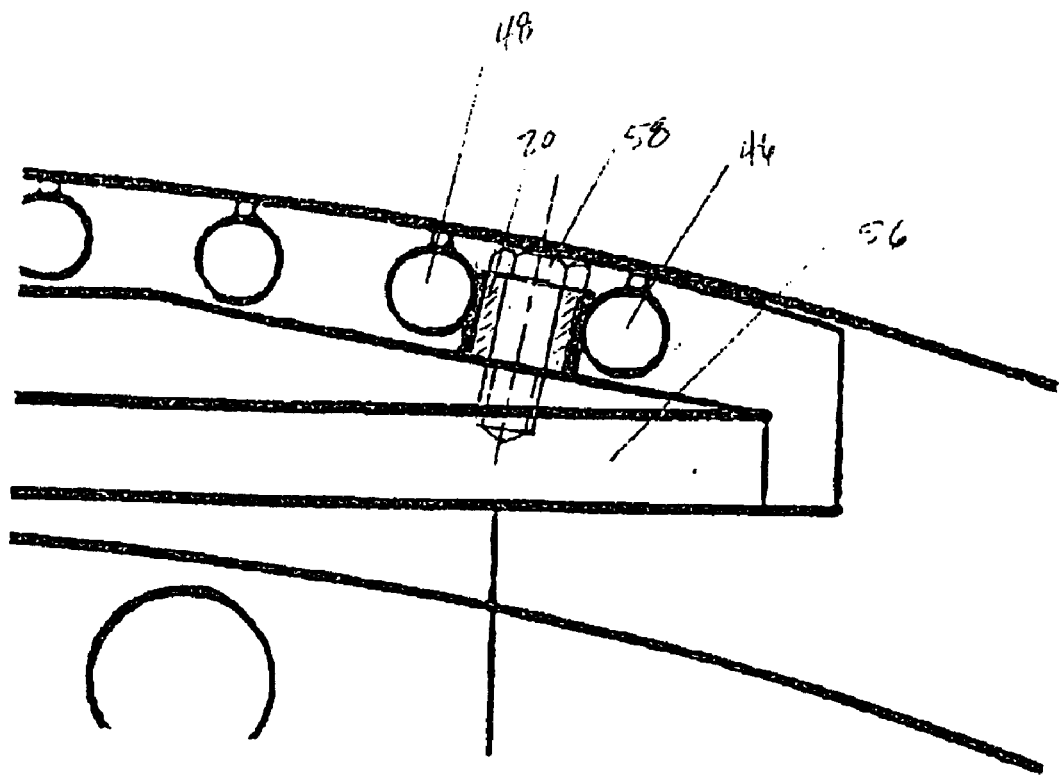
FIG. 5 is an axial view an amortisseur bar damping device shown in FIG. 2.

FIG. 5 is an axial view of amortisseur bar damping device 20 shown in FIG. 2. In an exemplary embodiment, amortisseur bar damping device 20 is mounted to endplate 56 and disposed between amortisseur bar 46 and amortisseur bar 48 with a fastener 58.

In another embodiment, amortisseur bar damping device 20 may be disposed between at least two or more amortisseur bars 16 by at least one of a weld, a fastener, and a locking plate. In an additional embodiment, amortisseur bar damping device 20 may be disposed between at least two or more amortisseur bars 16 by welding support member 26 to endplate 56 and bonding first and second resilient members 22 and 24 to support member 26 afterwards.

Figure 6:
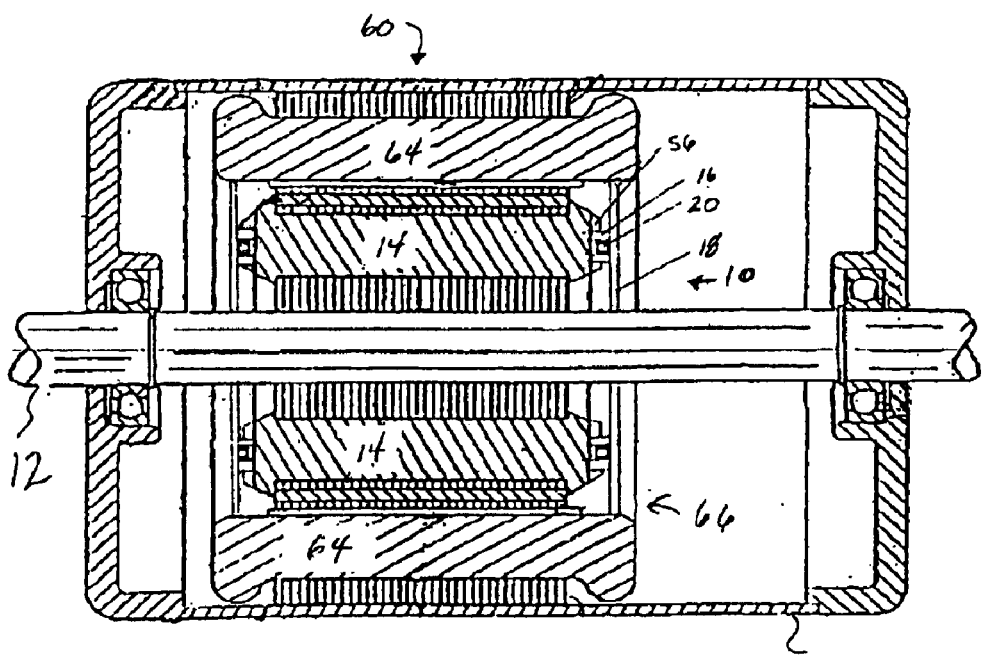
FIG. 6 is a cross section of a motor.

FIG. 6 is a cross sectional view of a motor 60 including a housing 62 and a stator 64 having a bore 66 therethrough. Stator 64 is mounted in housing 62. Rotor shaft 12 extends at least partially through bore 66 and rotor assembly 10 is mounted to rotor shaft 12. Rotor assembly 10 includes a rotor core 14 mounted on rotor shaft 12. Rotor assembly 10 also includes a plurality of amortisseur bars 16 extending axially through and projecting from at least one end of the rotor core 14. A plurality of endrings 18 connecting to amortisseur bars 16 distal from the rotor core 14 and an endplate 56. Rotor assembly 10 additionally includes amortisseur bar damping device 20 (shown in FIG. 2) mounted between at least two amortisseur bars 16 and distal from rotor core 14 and substantially proximate endrings 18.

Figure 7:
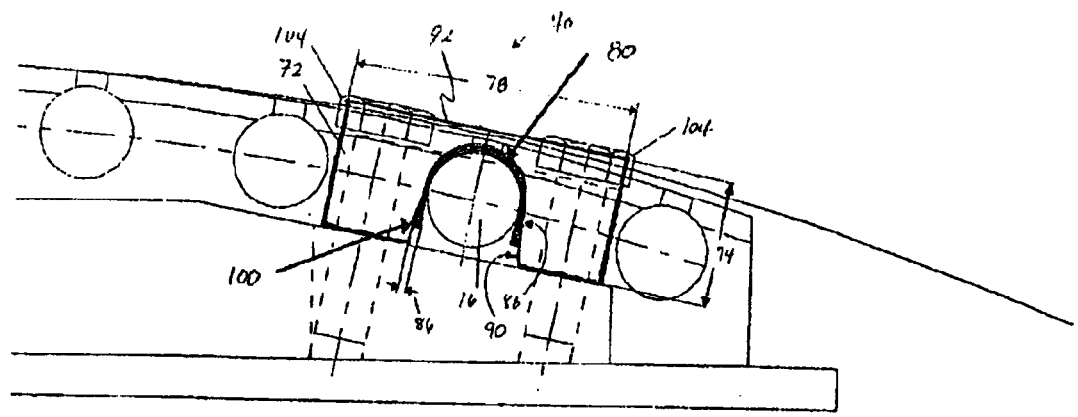
FIG. 7 is a perspective view of a different embodiment of an amortisseur bar damping device.
Figure 8:
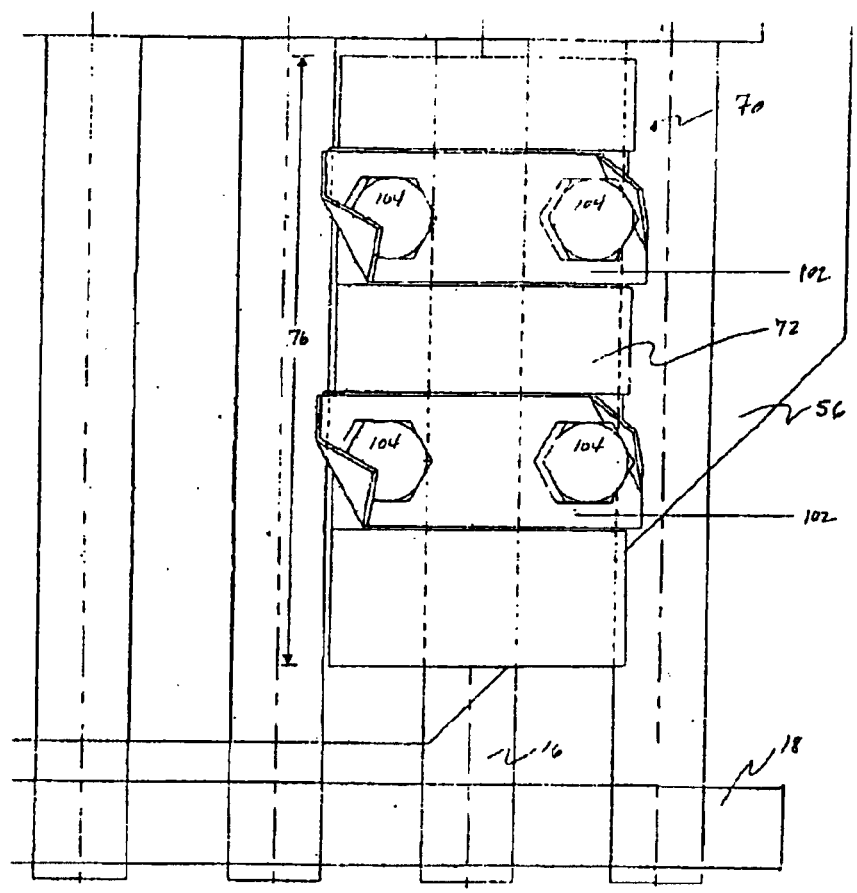
FIG. 8 is a plan view of the amortisseur bar damping device shown in FIG. 7.

FIG. 7 is a perspective view and FIG. 8 is a plan view of another embodiment of an amortisseur bar damping device 70 including a support member 72 and a resilient member 80 disposed to support member 72. Support member 72 includes a height 74, a length 76, and a thickness 78. In one embodiment, support member 72 is machined from a rigid material, and is substantially rectangular. Height 74 is about 0.900 inches, length 76 is about 5.000 inches and thickness 78 is about 2.000 inches. In one embodiment, support member 72 is machined from a metallic material such as stainless steel. Alternatively, support member 72 is manufactured from a non-metallic material such as a glass laminate, a plastic, and a composite.

Resilient member 80 includes a length (not shown in FIG. 7), a width (not shown in FIG. 7), a thickness 86, and a side 88. Thickness 86 is substantially constant. Resilient member 80 is substantially rectangular having the length substantially greater than the width. In one embodiment, resilient member"s 80 length is substantially equal to length 76. In another embodiment, resilient member"s 80 length is substantially less than or greater than length 76. In one embodiment, resilient member 80 is manufactured from an elastomer such as natural rubber, butyl, and neoprene.

Rigid support member 72 includes a first side 90, a second side 92 opposite first side 90, and a U shaped channel 100. Channel 100 is disposed longitudinally along first side 90. Resilient member side 88 is disposed to channel 100. In one embodiment, resilient member side 88 is bonded to channel 100. In an exemplary embodiment, amortisseur bar damping device 70 is mounted to endplate 56 and disposed on amortisseur bar 16 by a plurality of locking plates 102 and fasteners 104. Amortisseur bar damping device 70 is positioned substantially proximate to endring 18.

In an alternate embodiment, U shaped channel 100 is a rectangular channel. Additionally, channel 100 can be a shape other than rectangular shaped and U shaped, such as a shape with at least one line of symmetry and a shape with no lines of symmetry.

While the invention has been described in terms of various specific embodiments, those skilled in the art will recognize that the invention can be practiced with modification within the spirit and scope of the claims.

What is claimed is:

1. An amortisseur bar damping device comprising:
   a first amortisseur bar extending from a rotor core;
   a second amortisseur bar extending from the rotor core, said second amortisseur bar substantially parallel said first amortisseur bar; and
   a damping assembly contacting said first and second amortisseur bars comprising:
   a rigid support member including a first side and a second side opposite said first side; and
   a first resilient member coupled to said first side and a second resilient member coupled to said second side.

2. An amortisseur bar damping device in accordance with claim 1 wherein said first and second resilient members comprise a substantially rectangular shape.

3. An amortisseur bar damping device in accordance with claim 1 wherein said first and second resilient members comprise an elastomer.

4. An amortisseur bar damping device in accordance with claim 1 wherein said support member comprises a substantially cubicle shape.

5. An amortisseur bar damping device in accordance with claim 1 wherein said support member comprises stainless steel.

6. A damping assembly comprising:

a rotor core;

a first amortisseur bar extending from said rotor core;

a second amortisseur bar extending from said rotor core, said second amortisseur bar substantially parallel said first amortisseur bar; and a damping device contacting said first and second amortisseur bars distal from said rotor core and substantially proximate an endring, said damping device comprising:

a rigid support member including a first side and a second side, said first side opposite; and a first resilient member disposed to the first side and a second resilient member dispose to the second side.

7. A motor comprising:

a housing;

a stator comprising a bore therethrough, said stator mounted in said housing;

a rotor shaft extending at least partially through said bore; and a rotor assembly mounted on said rotor shaft, said rotor assembly comprising:

a rotor core mounted on said rotor shaft;

a plurality of amortisseur bars extending axially through and projecting from at least one end of said rotor core;

a plurality of endrings connected to each end of said amortisseur bars distal from said core;

an endplate attached to said core; and an amortisseur bar damping device mounted between at least two of said amortisseur bars, said amortisseur bar damping device distal said core and substantially proximate said endring.

8. A motor in accordance with claim 7 wherein said amortisseur bar damping device is secured to an endplate of a machine such that the damping assembly is positioned between and radially adjacent to a first amortisseur bar and a second amortisseur bar and distally from the rotor assembly.

9. A motor in accordance with claim 7 wherein said amortisseur bar damping device is secured to an endplate of a machine by at least one of a fastener, a weld and a locking plate.

10. An amortisseur bar damping device configured to fit between two amortisseur bars, said damping device comprising:

a rigid support member including a first side and a second side opposite said first side; and a first resilient member disposed to said first side and a second resilient member disposed to said second side, said rigid support member, first resilient member, and second resilient member sized to fit between the two amortisseur bars.

* * * * *